United States Patent
Gao et al.

(10) Patent No.: US 9,374,565 B2
(45) Date of Patent: *Jun. 21, 2016

(54) SYSTEM AND METHOD FOR MULTI-MATERIAL CORRECTION OF IMAGE DATA

(71) Applicant: GENERAL ELECTRIC COMPANY, Schenectady, NY (US)

(72) Inventors: Hewei Gao, Pewaukee, WI (US); Girijesh Kumar Yadava, Waukesha, WI (US); Adam Israel Cohen, Milwaukee, WI (US); Yannan Jin, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/535,017

(22) Filed: Nov. 6, 2014

(65) Prior Publication Data

US 2016/0134852 A1 May 12, 2016

(51) Int. Cl.
G06K 9/00 (2006.01)
H04N 9/31 (2006.01)
G06T 7/00 (2006.01)
(Continued)

(52) U.S. Cl.
CPC ............... *H04N 9/3185* (2013.01); *G06T 3/00* (2013.01); *G06T 5/001* (2013.01); *G06T 7/0012* (2013.01)

(58) Field of Classification Search
CPC ........................................................ G06K 9/00
USPC ............................................... 348/745, 744
See application file for complete search history.

(56) References Cited

U.S. PATENT DOCUMENTS 6,324,240 B1  11/2001  Yan et al.
6,430,252 B2   8/2002  Reinwand et al.
6,735,273 B2   5/2004  Flohr et al.
(Continued)

FOREIGN PATENT DOCUMENTS

CN      101416881 B       7/2010
DE    102005018660 A1    11/2006

OTHER PUBLICATIONS

Kachelriess et al., "Empirical cupping correction: a first-order raw data precorrection for cone-beam computed tomography", Medical Physics ;33(5):1269-74, May 2006.
(Continued)

*Primary Examiner* — Paulos M Natnael
(74) *Attorney, Agent, or Firm* — Pabrita K. Chakrabarti

(57) ABSTRACT

A method includes acquiring projection data of an object from a plurality of detector elements, reconstructing the acquired projection data into a first reconstructed image, and performing material characterization of an image volume of the first reconstructed image to reduce a number of materials analyzed in the image volume to two basis materials. Performing material characterization includes utilizing a generalized modeling function to estimate a fraction of at least one basis material within each voxel of the image volume. The method also includes generating a re-mapped image volume for the at least one basis material of the two basis materials, performing forward projection on at least the re-mapped image volume for the at least one basis material to produce a material-based projection, and generating multi-material corrected projections based on the material-based projection and a total projection attenuated by the object, which represents both of the two basis materials.

20 Claims, 6 Drawing Sheets

(51) Int. Cl.
*G06T 3/00* (2006.01)
*G06T 5/00* (2006.01)

(56) References Cited

U.S. PATENT DOCUMENTS

| | | | |
|---|---|---|---|
| 7,391,844 B2* | 6/2008 | Wu | A61B 6/032 378/18 |
| 7,453,974 B2 | 11/2008 | Van Steven-Daal et al. | |
| 7,747,057 B2* | 6/2010 | Wu | G06T 11/008 128/920 |
| 8,811,709 B2* | 8/2014 | Wu | G06K 9/00 378/4 |
| 9,025,815 B2* | 5/2015 | Wu | G06T 7/0012 378/4 |
| 2008/0159469 A1 | 7/2008 | Ruhrnschopf et al. | |
| 2011/0052022 A1* | 3/2011 | Xu | G01N 23/046 382/131 |
| 2011/0168878 A1 | 7/2011 | Hoerndler et al. | |
| 2014/0112565 A1 | 4/2014 | Roessl et al. | |
| 2014/0133719 A1* | 5/2014 | Wu | G06T 7/0012 382/131 |
| 2014/0328448 A1* | 11/2014 | Wu | G06T 7/0012 378/4 |
| 2015/0125055 A1* | 5/2015 | Gao | A61B 6/5258 382/131 |

OTHER PUBLICATIONS

Kyriakou et al., "Empirical Beam Hardening Correction (EBHC) for CT" Medical Physics, vol. 37, No. 10. pp. 5179-5187, Oct. 2010.

Zhang et al., "Beam Hardening Correction for Fan-Beam CT Imaging With Multiple Materials" Nuclear Science Symposium Conference Record (NSS/MIC), pp. 3566-3570, 2010.

Cai et al., "Bayesian Data Fusion and Inversion in X-Ray Multi-Energy Computed Tomography", Image Processing (ICIP), 2011 18th IEEE International Conference; 978-1-4577-1303-3, 2011.

Yang, et al "Multi-Material Beam Hardening Correction (MMBHC) in Computed Tomography", Proceedings of the 12th International Meeting on Fully Three-Dimensional Image Reconstruction in Radiology and Nuclear Medicine, Lake Tahoe, CA, USA; pp. 533-536, Jun. 2013.

* cited by examiner

SYSTEM AND METHOD FOR MULTI-MATERIAL CORRECTION OF IMAGE DATA

BACKGROUND

Non-invasive imaging technologies allow images of the internal structures or features of a patient to be obtained without performing an invasive procedure on the patient. In particular, such non-invasive imaging technologies rely on various physical principles, such as the differential transmission of X-rays through the target volume or the reflection of acoustic waves, to acquire data and to construct images or otherwise represent the observed internal features of the patient.

For example, in computed tomography (CT) and other X-ray based imaging technologies, X-ray radiation spans a subject of interest, such as a human patient, and a portion of the radiation impacts a detector where the image data is collected. In digital X-ray systems a photodetector produces signals representative of the amount or intensity of radiation impacting discrete pixel regions of a detector surface. The signals may then be processed to generate an image that may be displayed for review. In CT systems a detector array, including a series of detector elements, produces similar signals through various positions as a gantry is displaced around a patient.

In the images produced by such systems, it may be possible to identify and examine the internal structures and organs within a patient's body. However, the produced images may also include artifacts that adversely affect the quality of the images due to a variety of factors. For example, these factors may include beam hardening for non-water materials, heel-effect related spectral variation in wide cone CT systems, bone induced spectral (BIS) due to detection variation of different detector pixels coupled to spectral changes attenuated by bone or other non-water materials, and other factors. Present techniques to correct for these artifacts are inaccurate.

BRIEF DESCRIPTION

In accordance with a first embodiment, a method is provided. The method includes acquiring a first set of projection data of an object from a plurality of detector elements, reconstructing the acquired first set of projection data from the plurality of detector elements into a first reconstructed image, and performing material characterization of an image volume of the first reconstructed image to reduce a number of materials analyzed in the image volume to two basis materials. Performing material characterization of the image volume includes utilizing a generalized modeling function to estimate a fraction of at least one basis material within each voxel of the image volume. The method also includes generating a re-mapped image volume for the at least one basis material of the two basis materials, and performing forward projection on at least the re-mapped image volume for the at least one basis material to produce a material-based projection. The method further includes generating multi-material corrected projections based on the material-based projection and a total projection attenuated by the object, which represents both of the two basis materials.

In accordance with a second embodiment, one or more non-transitory computer readable media are provided. The computer-readable media encode one or more processor-executable routines. The one or more routines, when executed by a processor, cause acts to be performed including: acquiring a first set of projection data of an object from a plurality of detector elements, reconstructing the acquired projection data from the plurality of detector elements into a first reconstructed image, and performing material characterization of an image volume of the first reconstructed image to reduce a number of materials analyzed in the image volume to two basis materials. Performing material characterization of the image volume includes utilizing a generalized modeling function to estimate a fraction of at least one basis material within each voxel of the image volume. The acts to be performed also include generating a re-mapped image volume for the at least one basis material of the two basis materials, and performing forward projection on at least the re-mapped image volume for the at least one basis material to produce a material-based projection. The acts to be performed further include generating multi-material corrected projections based on the material-based projection and a total projection attenuated by the object, which represents both of the two basis materials.

In accordance with a third embodiment, a system is provided. The system includes a memory structure encoding one or more processor-executable routines. The routines, when executed, cause acts to be performed including: acquiring a first set of projection data of an object from a plurality of detector elements, reconstructing the acquired projection data from the plurality of detector elements into a first reconstructed image, and performing material characterization of an image volume of the first reconstructed image to reduce a number of materials analyzed in the image volume to two basis materials. Performing material characterization of the image volume includes utilizing a generalized modeling function to estimate a fraction of at least one basis material within each voxel of the image volume. The acts to be performed also include generating a re-mapped image volume for the at least one basis material of the two basis materials, and performing forward projection on at least the re-mapped image volume for the at least one basis material to produce a material-based projection. The acts to be performed further include generating multi-material corrected projections based on the material-based projection and a total projection attenuated by the object, which represents both of the two basis materials. The system also includes a processing component configured to access and execute the one or more routines encoded by the memory structure.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
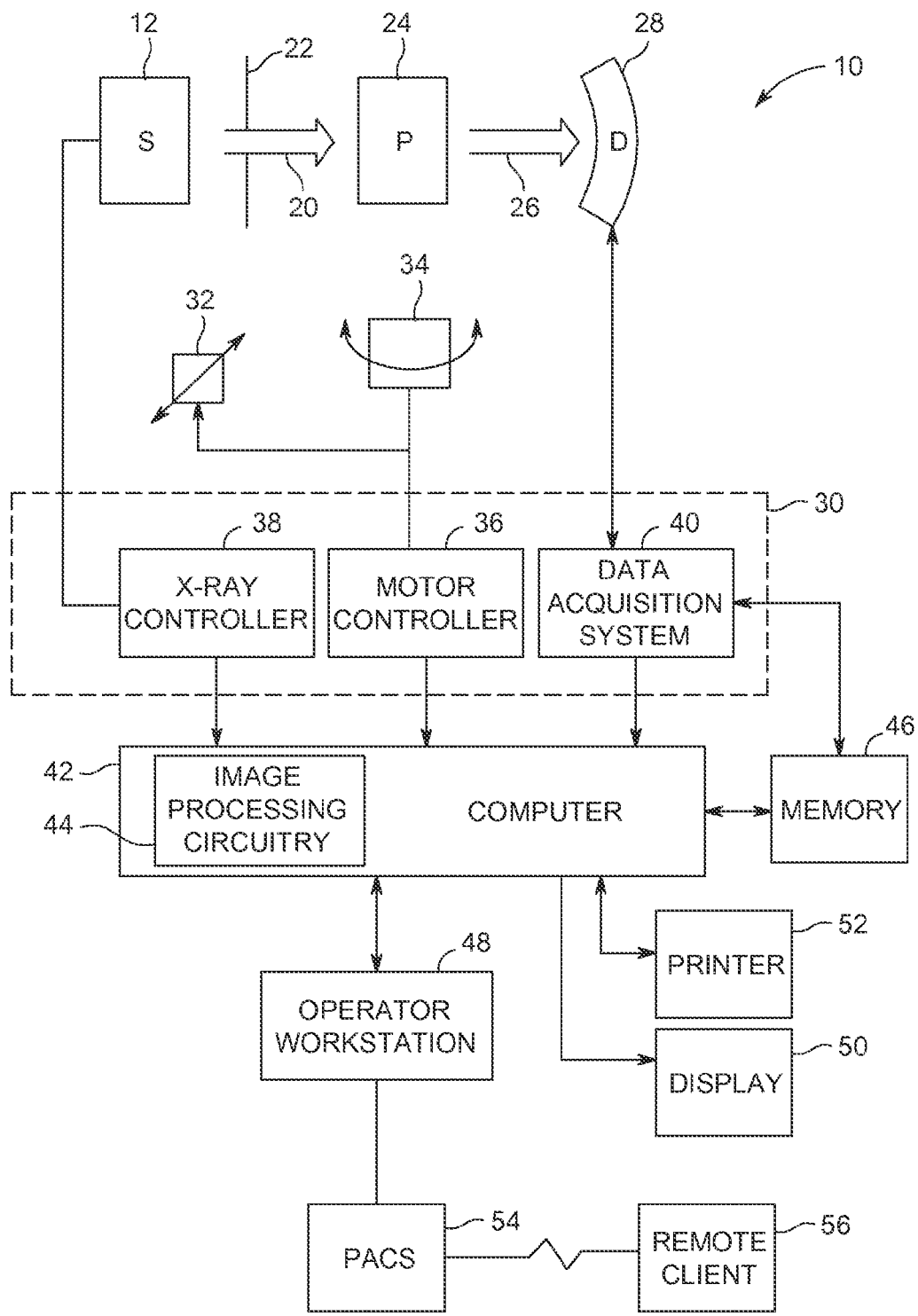
FIG. 1 is a schematic illustration of an embodiment of a computed tomography (CT) system configured to acquire CT images of a patient and to process the images in accordance with aspects of the present disclosure.

While the following discussion is generally provided in the context of medical imaging, it should be appreciated that the present techniques are not limited to such medical contexts. Indeed, the provision of examples and explanations in such a medical context is only to facilitate explanation by providing instances of real-world implementations and applications. However, the present approaches may also be utilized in other contexts, such as the non-destructive inspection of manufactured parts or goods (i.e., quality control or quality review applications), and/or the non-invasive inspection of packages, boxes, luggage, and so forth (i.e., security or screening applications).

Tissue characterization or classification may be desirable in various clinical contexts to assess the tissue being characterized for pathological conditions and/or to assess the tissue for the presence of various elements, chemicals or molecules of interest. However, tissue characterization in imaging studies, such as using computed tomography (CT), may be problematic due to the presence of artifacts present within the reconstructed images. These artifacts may be present due to a variety of sources. For instance, due to the nature of a polychromatic X-ray beam produced by the Bremsstrahlung process, the beam attenuated by different materials of an imaged subject will result in different exit beam spectra. The effect of the polychromatic nature of the input X-ray spectra and the energy-dependent nature of material attenuation by different materials induces "beam hardening" artifacts in the reconstructed image. In addition, the mean value of a given material is not constant. For example, presently the CT value of a non-water material is a function of the incident beam, location of the materials, type of reconstruction due to weighting, and adjacent materials around a region of interest (ROI). However, from a physics point of view, the presence of the beam hardening artifact is due to a single reason, the measured projections of a given type of material is not linearly proportional to the length of the material at different view angles.

Further factors also result in artifacts in the reconstructed images. For example, the "heel-effect" causes incident beam spectrum variation inside a wide cone angle, especially a beam with a few degrees take-off angle from the anode. The heel-effect results in different mean values of non-water materials across the cone angle. Another factor is due to the detection system in any clinical CT system not being perfect. For example, each detector pixel might have a slightly different response to given incident spectrum, resulting in differential errors in detection when the incident beam is not purely water-attenuated, causing a bone-induced spectral (BIS) artifact. Typically, iterative bone option (IBO) and BIS correction techniques used to correct these artifacts are subject to error.

In a physics-based multi-material correction (MMC) approach, physics-based material decomposition (e.g., inverse basis material decomposition) may be utilized. In physics-based material decomposition, the model for a voxel to be decomposed (i.e., the selection of material T and its CT number $HU_T$) is important but prone to introducing error if mismodeled. In addition, since the energy of X-ray photons changes as they penetrate the object, the ratio R (determined by the selection of the effective keV (E) is just an approximation. Therefore, empirically determining a function to estimate iodine fraction based on simulated or measured data that are more relevant to practical applications, may result in a more accurate MMC. As discussed herein, in various implementations, a multi-material correction (MMC) approach is employed to compensate for artifacts within the reconstructed images. In particular, the MMC approach (e.g., algorithm) is designed to deal with the different sources of beam-hardening related issues described above. The MMC approach utilizes a generalized modeling function to estimate a basis material fraction (e.g., iodine fraction) in each voxel of an image volume. In certain embodiments, the generalized modeling function may be empirically based. The generalized modeling function may enable a more flexible model than a physics-based material decomposition (e.g., due to the fixed nature of coefficients utilized in estimating basis material fractions). The MMC approach utilizing the generalized modeling function provides more accurate and consistent CT values of bone, soft tissue, and contrast agent for better clinical diagnosis. Thus, the MMC approach also minimizes the beam-hardening artifacts in the images that originate from bone, contrast agent, and metal implants (even more so then a physics-based MMC approach). Additional direct clinical benefits due to the MMC approach include improved image quality, better differentiation between cysts and metastases, better delineation of bone-brain interface and accurate contrast measurement in CT perfusion. Further, the value of the contrast agent or bone can be corrected to be only kVp dependent, or more precisely, effective keV dependent, which is close to offering a monochromatic beam. Yet further, in contrast to the current techniques used with clinical CT systems, the MMC approach is not dependent on patient size or the location of the region-of-interest (ROI). Thus, the MMC approach may provide a technique for providing accurate CT values for contrast agent and bone.

With the foregoing discussion in mind, FIG. 1 illustrates an embodiment of an imaging system 10 for acquiring and processing image data in accordance with aspects of the present disclosure. In the illustrated embodiment, system 10 is a computed tomography (CT) system designed to acquire X-ray projection data, to reconstruct the projection data into a tomographic image, and to process the image data for display and analysis. The CT imaging system 10 includes an X-ray source 12. As discussed in detail herein, the source 12 may include one or more X-ray sources, such as an X-ray tube or solid state emission structures. The X-ray source 12, in accordance with present embodiments, is configured to emit an X-ray beam 20 at one or more energies. Although the following techniques discussed below utilize the emission of the beam at a single emission spectrum, the same techniques may be applied for the emission of the beam at two or more energies, although single-energy embodiments are discussed herein to simplify explanation. For example, the X-ray source 12 may be configured to switch between relatively low energy polychromatic emission spectra (e.g., at about 80 kVp) and relatively high energy polychromatic emission spectra (e.g., at about 140 kVp). Also, the X-ray source 12 may emit at polychromatic spectra localized around energy levels (i.e., kVp ranges) other than those listed herein (e.g., 100 kVP, 120 kVP, etc.). Indeed, selection of the respective energy levels for emission may be based, at least in part, on the anatomy being imaged.

In certain implementations, the source 12 may be positioned proximate to a collimator 22 used to define the size and shape of the one or more X-ray beams 20 that pass into a region in which a subject 24 (e.g., a patient) or object of interest is positioned. The subject 24 attenuates at least a portion of the X-rays. Resulting attenuated X-rays 26 impact a detector array 28 formed by a plurality of detector elements (e.g., pixels). Each detector element produces an electrical signal that represents the intensity of the X-ray beam incident at the position of the detector element when the beam strikes the detector 28. Electrical signals are acquired and processed to generate one or more scan datasets.

A system controller 30 commands operation of the imaging system 10 to execute examination and/or calibration protocols and to process the acquired data. With respect to the X-ray source 12, the system controller 30 furnishes power, focal spot location, control signals and so forth, for the X-ray examination sequences. The detector 28 is coupled to the system controller 30, which commands acquisition of the signals generated by the detector 28. In addition, the system controller 30, via a motor controller 36, may control operation of a linear positioning subsystem 32 and/or a rotational subsystem 34 used to move components of the imaging system 10 and/or the subject 24. The system controller 30 may include signal processing circuitry and associated memory circuitry. In such embodiments, the memory circuitry may store programs, routines, and/or encoded algorithms executed by the system controller 30 to operate the imaging system 10, including the X-ray source 12, and to process the data acquired by the detector 28 in accordance with the steps and processes discussed herein. In one embodiment, the system controller 30 may be implemented as all or part of a processor-based system such as a general purpose or application-specific computer system.

The source 12 may be controlled by an X-ray controller 38 contained within the system controller 30. The X-ray controller 38 may be configured to provide power and timing signals to the source 12. In addition, in some embodiments the X-ray controller 38 may be configured to selectively activate the source 12 such that tubes or emitters at different locations within the system 10 may be operated in synchrony with one another or independent of one another. The X-ray controller 38 is configured to control the source 12 to emit X-rays at a single polychromatic energy spectrum in an image acquisition sequence to acquire a single energy dataset. In certain embodiments, the X-ray controller 38 may be configured to provide fast-kVp switching of the X-ray source 12 so as to rapidly switch the source 12 to emit X-rays at the respective different polychromatic energy spectra in succession during an image acquisition session. For example, in a dual-energy imaging context, the X-ray controller 38 may operate the X-ray source 12 so that the X-ray source 12 alternately emits X-rays at the two polychromatic energy spectra of interest, such that adjacent projections are acquired at different energies (i.e., a first projection is acquired at high energy, the second projection is acquired at low energy, the third projection is acquired at high energy, and so forth). In one such implementation, the fast-kVp switching operation performed by the X-ray controller 38 yields temporally registered projection data. In some embodiments, other modes of data acquisition and processing may be utilized. For example, a low pitch helical mode, rotate-rotate axial mode, N×M mode (e.g., N low-kVp views and M high-kVP views) may be utilized to acquire dual-energy datasets.

As noted above, the X-ray source 12 may be configured to emit X-rays at one or more energy spectra. Though such emissions may be generally described or discussed as being at a particular energy (e.g., 80 kVp, 140 kVp, and so forth), the respective X-ray emissions at a given energy are actually along a continuum or spectrum and may, therefore, constitute a polychromatic emission centered at, or having a peak strength at, the target energy.

The system controller 30 may include a data acquisition system (DAS) 40. The DAS 40 receives data collected by readout electronics of the detector 28, such as sampled analog signals from the detector 28. The DAS 40 may then convert the data to digital signals for subsequent processing by a processor-based system, such as a computer 42. In other embodiments, the detector 28 may convert the sampled analog signals to digital signals prior to transmission to the data acquisition system 40. The computer 42 may include or communicate with one or more non-transitory memory devices 46 that can store data processed by the computer 42, data to be processed by the computer 42, or instructions to be executed by a processor 44 of the computer 42. For example, a processor of the computer 42 may execute one or more sets of instructions stored on the memory 46, which may be a memory of the computer 42, a memory of the processor, firmware, or a similar instantiation. In accordance with present embodiments, the memory 46 stores sets of instructions that, when executed by the processor, perform image processing methods as discussed herein (e.g., performance of MMC).

The computer 42 may also be adapted to control features enabled by the system controller 30 (i.e., scanning operations and data acquisition), such as in response to commands and scanning parameters provided by an operator via an operator workstation 48. The system 10 may also include a display 50 coupled to the operator workstation 48 that allows the operator to view relevant system data, imaging parameters, raw imaging data, reconstructed data, contrast agent density maps produced in accordance with the present disclosure, and so forth. Additionally, the system 10 may include a printer 52 coupled to the operator workstation 48 and configured to print any desired measurement results. The display 50 and the printer 52 may also be connected to the computer 42 directly or via the operator workstation 48. Further, the operator workstation 48 may include or be coupled to a picture archiving and communications system (PACS) 54. PACS 54 may be coupled to a remote system 56, radiology department information system (RIS), hospital information system (HIS) or to an internal or external network, so that others at different locations can gain access to the image data.

Figure 2:
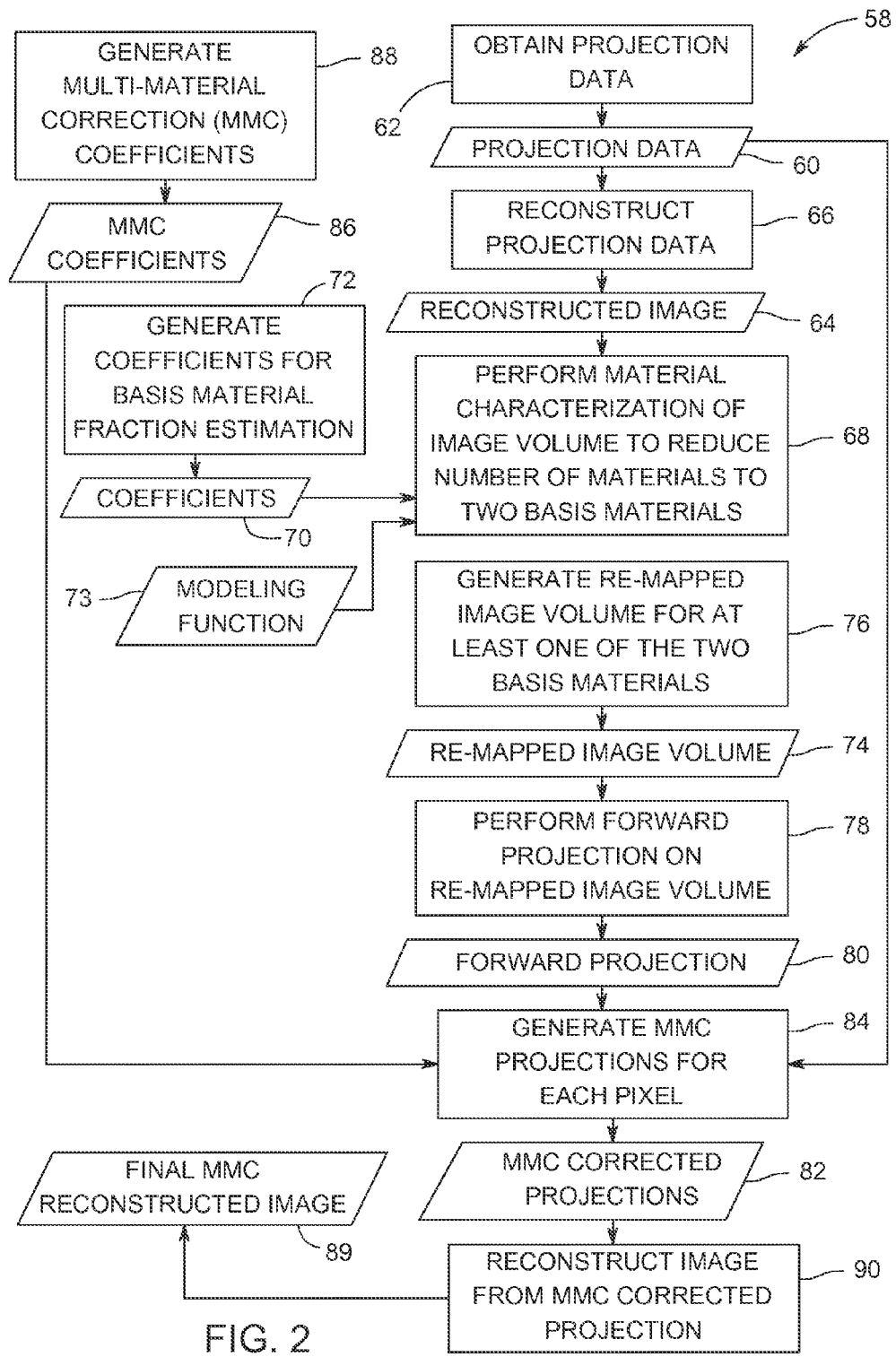
FIG. 2 is a process flow diagram of an embodiment of a method for performing multi-material correction (MMC) on projection data.

Keeping in mind the operation of the system 10 and, specifically, the X-ray source 12 discussed above with respect to FIG. 1, FIG. 2 illustrates a process flow diagram of an embodiment of a method 58 for performing MMC on projection data (e.g., datasets). Any suitable application-specific or general-purpose computer having a memory and processor may perform some or all of the steps of the method 58. By way of example, as noted above with respect to FIG. 1, the computer 42 and associated memory 46 may be configured to perform the method 58. For example, the memory 46, which may be any tangible, non-transitory, machine-readable medium (e.g., an optical disc, solid state device, chip, firmware), may store one or more sets of instructions that are executable by a processor of the computer 42 to perform the steps of method 58. In accordance with present embodiments, the processor, in performing MMC 58, may generate one or more images corrected via MMC.

The method 58 includes obtaining projection data 60 (e.g., datasets) (block 62), for example, by acquiring the projection data 60 via the CT system 10 described above (e.g., via scanning an object). The method 58 also includes reconstructing the projection data 60 from a plurality of pixels (e.g., detector elements) into a reconstructed image 64 (e.g., full field of view (FOV) reconstructed image) (block 66). The method 58 includes performing material characterization on an image volume (e.g., one or more voxels) of the reconstructed image 64 (block 68) to reduce a number of materials analyzed in each pixel to two basis materials (e.g., iodine and water). In general, there are four distinct materials in a human body: soft tissue, bone, iodine, and, if present, metal implants. Also, if calcium is dense enough, it can approximately be considered as cortical bone. Other basis material pairs may be chosen from other materials such as calcium, metal, and bone. The use of two basis materials enables a complex body composition to be simplified into two components. This reduces the need for forward projections for other materials (i.e., those not selected as the basis materials). Using this theory, bone and metal are represented by water and iodine, and the human body may be described by a two-material system. As a result beam hardening is completely determined by the combination of two material projections. The material characterization enables the transformation of multiple materials (e.g., metal, bone, etc.) in the image volume into proper representations of two basis materials (e.g., water and iodine). As described in greater detail below, the material characterization of the image volume may include performing material segmentation followed by utilizing a generalized modeling function to estimate a basis material fraction (e.g., iodine) in each voxel of the image volume.

Performing material characterization of the image volume of the reconstructed image 64 includes performing material segmentation on the image volume. Among distinct materials in the human body (e.g., soft tissue, bone, iodine, and metal implants), two different algorithms may be utilized for the material segmentation. The first algorithm may be Hounsfield units (HU) value (e.g., CT value) based, where the different materials are separated based on designated HU levels and/or ranges representative of each material. The second algorithm may be used for bone tracking, in particular, to separate soft bone from iodine. The method 92 may utilize the first algorithm or both the first and second algorithm for material segmentation. In certain embodiments, the composition of the human body may be segmented into more detailed components such as fat, muscle, stent, calcification, and so forth, which can be integrated into the method 58. In addition, other information may be used to guide segmentation. For example, if the scan is obtained prior to introduction of a contrast agent, input may be provided to the algorithm that iodine is not present in the image. Additionally, pre-contrast agent scans may be used as prior information for post-contrast scan correction. In particular, pre-contrast agent images may provide detailed information on the location and size of the bone region and used to further guide segmentation.

Upon performing material segmentation, in certain techniques, a physics-based material decomposition may be utilized (e.g., inverse basis material decomposition). Physics-based decomposition may also be utilized to determine the equivalent iodine fraction from other materials other than iodine by using the effective keV or using the density of a material to be decomposed. In the effective keV approach, for a voxel identified as material X (let its CT number be $HU_T$) which contains material T and pure material X, the following may be represented as:

$$HU_x = (1-\sigma)HU_T + \sigma HU_{PX}. \quad (1)$$

$HU_T$ represents the CT number for material T, $HU_{PX}$ represents the CT number for the pure material X, and $$\sigma = \frac{HU_x - HU_T}{HU_{PX} - HU_T}. \quad (2)$$

Then, the iodine fraction (expressed by HU) can be computed as $$HU_{xio} \approx m_{xio} \times R \times HU_{PX} \times \frac{HU_x - HU_T}{HU_{PX} - HU_T}, \quad (3)$$

when $$R = \frac{\left(\frac{\mu}{\rho}\right)_{io}(\bar{E})}{\left(\frac{\mu}{\rho}\right)_{PX}(\bar{E})}, \quad (4)$$

where R is a ratio dependent on the selected effective keV ($\bar{E}$) and $m_{xio}$ is the material decomposition factor of material X for iodine, assuming $$\left(\frac{\mu}{\rho}\right)_{PX}(E) = m_{xw}\left(\frac{\mu}{\rho}\right)_w(E) + m_{xio}\left(\frac{\mu}{\rho}\right)_{io}(E). \quad (5)$$

When material T is air, $HU_T=0$; when material T is water, $HU_T=1000$. In the approach that uses the density of the material to be decomposed, the iodine fraction can be computed as $$HU_{xio} \approx (HU_{PX} - 1000 m_{xw}\rho_{PX}) \times \frac{HU_x - HU_T}{HU_{PX} - HU_T}, \quad (6)$$

where $\rho_{PX}$ is the density for pure material X.

However, in the physics-based material decomposition above, the model for the voxel to be decomposed (i.e., the selection of material T and its CT number $HU_T$) is important but prone to introducing error if mismodeled. In addition, since the energy of X-ray photons changes as they penetrate the object, the ratio R (determined by the selection of the effective keV ($\bar{E}$) is just an approximation. Therefore, empirically determining a function to estimate iodine fraction based on simulated or measured data that are more relevant to practical applications, may result in a more accurate MMC. This is feasible because in equations 3 and 6, the iodine fraction estimation can be expressed as a first order polynomial function, $$HU_{xio} \approx \omega_0 + \omega_1 \times HU_x, HU_x[T1,T2], \quad (7)$$

where T1 and T2 are the lower and upper bounds used in segmentation for the material X. In other embodiments, a higher order polynomial function may be utilized (e.g., second order, third order, fourth order, etc.) for the generalized modeling function. Equation 4 (an example of a generalized modeling function) indicates that inverse basis material decomposition may be replaced by modeling the iodine fraction estimation (or any other basis material fraction) as a generalized function (such as equation 4) and using an optimization approach to generate appropriate coefficients for estimating a basis material fraction (e.g., iodine fraction). Also, a generalized modeling function, such as equation 4, provides a more flexible model because the physics-based material decomposition in equations 3 and 6 presumes a fixed relationship between $\omega_0$ and $\omega_1$, i.e., the coefficients for basis material fraction estimation, as shown in $$\omega_0 = -HU_T\omega_1, \qquad (8)$$

which may not be the best in practical applications. In order to estimate the basis material fraction (e.g., iodine fraction) in each voxel, the method 58 includes generating coefficients 70 (e.g., $\omega_0$ and $\omega_1$) for the basis material fraction estimation (block 72) utilizing a generalized modeling function 73. Different approaches, as described greater detail below, may be utilized to generate the coefficients 70.

The method 58 further includes generating a remapped image volume 74 (e.g., material-based projection from a re-mapped pixel) (block 76) for at least one basis material (e.g., iodine) of the two basis materials (e.g., iodine and water). In certain embodiments, remapped projections 74 may be obtained for both basis materials (e.g., iodine and water). To utilize MMC, projections involving two basis materials are needed. For example, the projections involving the two basis materials include a total projection (e.g., water and iodine) attenuated by the object, which also represents both basis materials, and a projection contributed by one of the two basis materials (e.g., iodine) that represents the sums of the equivalent portions of each of the materials (e.g., non-water materials) that is not included in the other basis material of the basis material pair. The method 58 yet further includes performing forward projection on the re-mapped image volume 74 (block 78) to generate a forward projection 80 for at least one basis material (e.g., iodine) to produce a material-based (e.g., iodine-based) projection. Typically, a forward projection is not necessary for the total projection since the total projection from the measurement (i.e., projection data 60) already exists. Thus, only a single forward projection is required. In certain embodiments, forward projections may be performed on both a re-mapped total projection and the re-mapped projection of the projection contributed by one of the two basis materials (e.g., iodine). The image volume is forward-projected using the exact system geometry, and the forward projections are interpolated into the same ray directions and the same number of views as the measured projections (e.g., projection data 60) by the detection system, which results in paired data projection sets.

The method 58 includes generating MMC corrected projections 82 for each pixel based on the material-based projection 80 and initial total projection (e.g., projection data 60) representing attenuation through both of the two basis materials (e.g., iodine and water) (block 84). In certain embodiments, the initial total projection may be a spectrally corrected total raw projection. In certain embodiments, the method 58 may include generating MMC coefficients 86 (block 88), which may also be utilized in generating the MMC corrected projections 82 (block 84). The MMC coefficients 86 may be generated as described in greater detail below in FIG. 3. The method 58 further includes reconstructing a final MMC reconstructed image 89 from the MMC corrected projections 82 (block 90).

Figure 3:
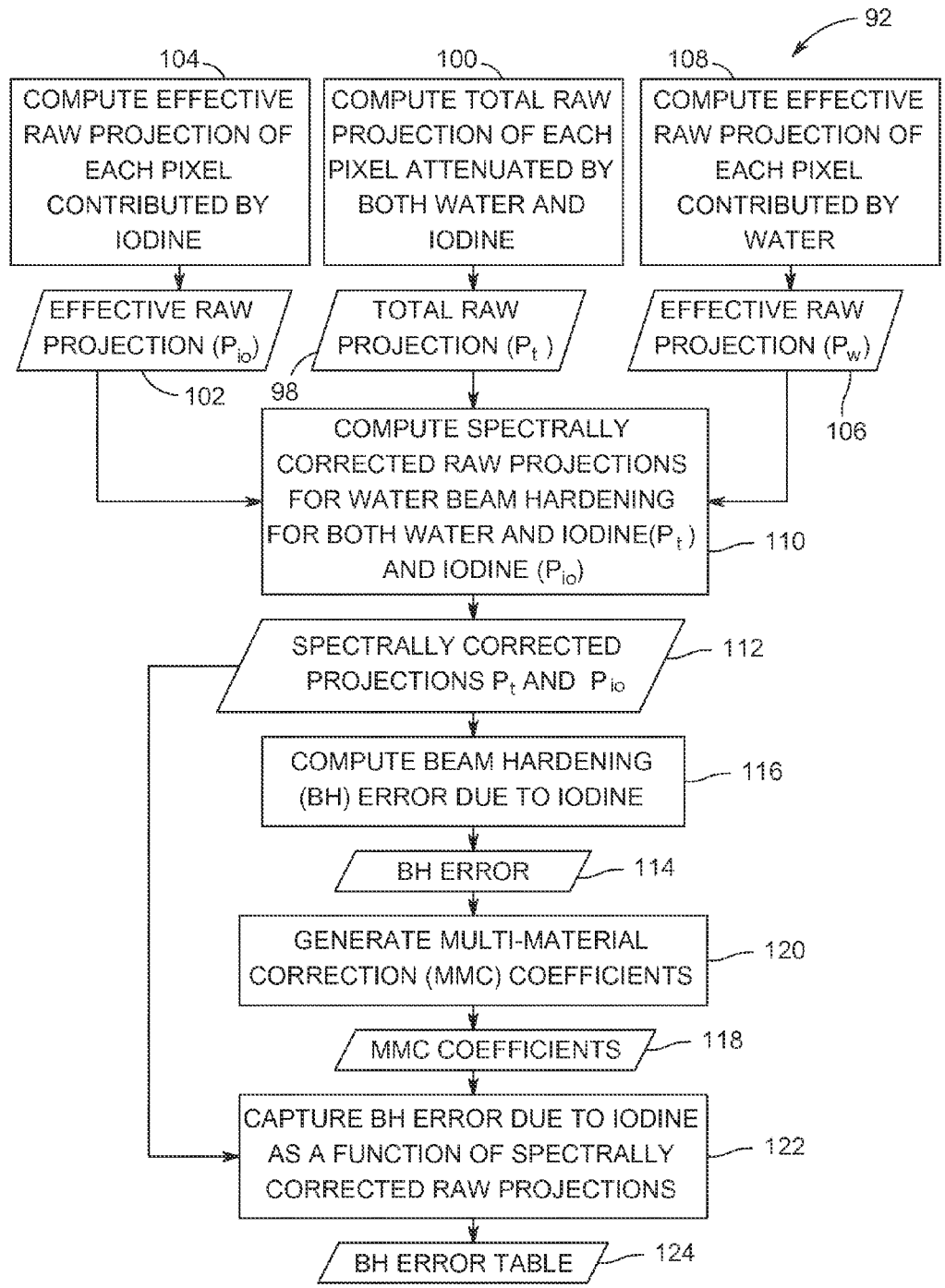
FIG. 3 is a process flow diagram of an embodiment of a method for generating MMC coefficients and a beam hardening error table (e.g., utilizing water and iodine as basis materials)

FIG. 3 illustrates a process flow diagram of an embodiment of a method 92 for generating MMC coefficients 86 and a beam hardening error table (e.g., utilizing water and iodine as basis materials). As noted above, other materials may be used for the basis material pair. Any suitable application-specific or general-purpose computer having a memory and processor may perform some or all of the steps of the method 92. By way of example, as noted above with respect to FIG. 1, the computer 42 and associated memory 46 may be configured to perform the method 92. For example, the memory 46, which may be any tangible, non-transitory, machine-readable medium (e.g., an optical disc, solid state device, chip, firmware), may store one or more sets of instructions that are executable by a processor of the computer 42 to perform the steps of method 92. In accordance with present embodiments, the processor, in performing method 92, may generate MMC coefficients 86 and a beam hardening error table.

Turning to FIG. 3, in the depicted implementation, the method 92 includes obtaining the material linearization function (e.g., mapping function) or beam hardening projection error for each pixel based on detection coefficients and synthesized water and iodine projections during calibration. The mapping function takes a polynomial form for the water (or water and iodine) and iodine projections. The water and iodine projections to compute the mapping function are synthesized through system modeling, while the projections used in the MMC correction described above in FIG. 2 are obtained from total measured projection and forward projecting the volume of reconstructed images. The modeling process is both accurate and simplistic due to the absence of complex physical phantoms. In order to obtain the mapping functions, the method 92 includes computing raw projections through $L_w$, which represents the thickness of water, and $L_{io}$, which represents the thickness of iodine. In particular, the method 92 includes computing a total raw projection ($p_t$) 98 of each pixel attenuated by both water and iodine (block 100) in the following equation:

$$p_t = -\log\left(\frac{\sum_E^{kV} S_{kv}(E) \cdot E \cdot e^{-\mu_w(E)L_w - \mu_{io}(E)L_{io}} \cdot \eta(E) \cdot \varepsilon(E)}{\sum_E^{kV} S_{kv}(E) \cdot E \cdot \eta(E) \cdot \varepsilon(E)}\right), \qquad (9)$$

where index kv represents the tube voltage at a given detector row location, E represents the photon energy, $S_{kv}(E)$ represents the incident spectrum, $\eta(E)$ represents the scintillator stopping power, $\mu_w(E)$ represents the water mass attenuation coefficient, $\mu_{io}(E)$ represents the iodine mass attenuation coefficient, and $\varepsilon(E)$ represents the detection coefficient. The method 92 also includes computing the effective raw projection ($p_{io}$) 102 of each pixel contributed by iodine (i.e., attenuated by water) in the following equation:

$$p_{io} = -\log\left(\frac{\sum_E^{kV} S_{kv}(E) \cdot E \cdot e^{-\mu_w(E)L_w - \mu_{io}(E)L_{io}} \cdot \eta(E) \cdot \varepsilon(E)}{\sum_E^{kV} S_{kv}(E) \cdot E \cdot e^{-\mu_w(E)L_w} \cdot \eta(E) \cdot \varepsilon(E)}\right). \qquad (10)$$

The method 92 also includes computing an effective raw projection ($p_w$) 106 of each pixel contributed by water (i.e., attenuated by iodine) in the following equation:

$$p_w = -\log\left(\frac{\sum_{E}^{kV} S_{kv}(E) \cdot E \cdot e^{-\mu_w(E)L_w} \cdot \eta(E) \cdot \varepsilon(E)}{\sum_{E}^{kV} S_{kv}(E) \cdot E \cdot \eta(E) \cdot \varepsilon(E)}\right). \quad (11)$$

Upon obtaining the projections, the method 92 includes spectrally correcting the raw projections 98, 100 for water beam hardening (block 110) to generate a spectrally corrected total projection ($P_t$) attenuated by both water and iodine and a spectrally corrected effective iodine projection ($P_{io}$) 112. In particular, the spectrally corrected total projection ($P_t$) 112 is obtained by the following:

$$P_t = \sum_{n=1}^{NR} a_n p_t^n, \quad (12)$$

where NR represents the beam hardening (BH) order and $a_n$ represents the BH coefficients. The BH order may range from 3 to 5. The spectrally corrected effective iodine projection ($P_{io}$) 112 is obtained by the following:

$$P_{io} = \sum_{n=1}^{NR} a_n p_t^n - \sum_{n=1}^{NR} a_n p_w^n. \quad (13)$$

Due to the beam hardening from iodine, linearity does not hold after spectral correction. That is $$P_t \neq \mu_1 L_w + \mu_2 L_{io} \quad (14)$$

for all the possible combination of ($L_w$, $L_{io}$), where $\mu_1$ and $\mu_2$ are two constants that typically represent the attenuation coefficients at the effective beam energy. In other words, the polychromatic signal ($P_t$) does not equal the sum of the monochromatic signals $\mu_1 L_w$ and $\mu_2 L_{io}$. This non-linearity arising from physics is the root cause of beam hardening in CT images. The mapping functions correct for such non-linearity. The method 92 includes computing the BH error 114 due to iodine (block 116), which is the difference between the sum of the monochromatic signals and the polychromatic signal, as represented by:

$$\Delta p(P_t, P_{io}) = (\mu_1 L_w + \mu_2 L_{io}) - P_t, \quad (15)$$

where $\Delta_p(P_t, P_{io})$ represents the BH error 114.

The method 92 includes generating MMC coefficients ($m_{\alpha\beta}$) 118 for each pixel (block 120). The MMC coefficients 118 are obtained through fitting the data pairs $\{(P_t, P_{io}), \Delta_p(P_t, P_{io})\}$ generated in equation 15. In other words, the generation of MMC coefficients is based on the BH error 114, the spectrally corrected total raw projection ($P_t$) 112, and the spectrally corrected iodine projection ($P_{io}$) 112. The fitting is applied to each individual detector pixel. Thus, the MMC coefficients 118 already include a self adjustment to correct for BIS artifacts. This eliminates the need for a separate BIS correction step because when MMC is performed, BIS correction is applied automatically.

From simulation, and using the above equations, the method 92 includes capturing the BH error due to iodine as a function of spectrally corrected raw projections (block 122). In particular, the process of capturing the BH error is iterated for $L_w$=0 to 50 cm, step=1 cm, and $L_{io}$=0 to 3 cm, step=0.15 cm, to enable building a functional table 124 of BH error due to iodine against projection values, $P_t$ and $P_{io}$. The BH error is expressed in the following polynomial form:

$$\Delta p(P_t, P_{io}) = \sum_{\alpha=0,\beta=1}^{\alpha=n_1,\beta=n_2} m_{\alpha\beta} P_t^\alpha P_{io}^\beta. \quad (16)$$

In equation (16), $P_t$ and $P_{io}$ are to the $n_1$ and $n_2$ order, respectively, and these are not constant. A rank up to the third order is sufficient for both $n_1$ and $n_2$. From these equations, the mapping functions are obtained that correct for the non-linearity.

Figure 4:
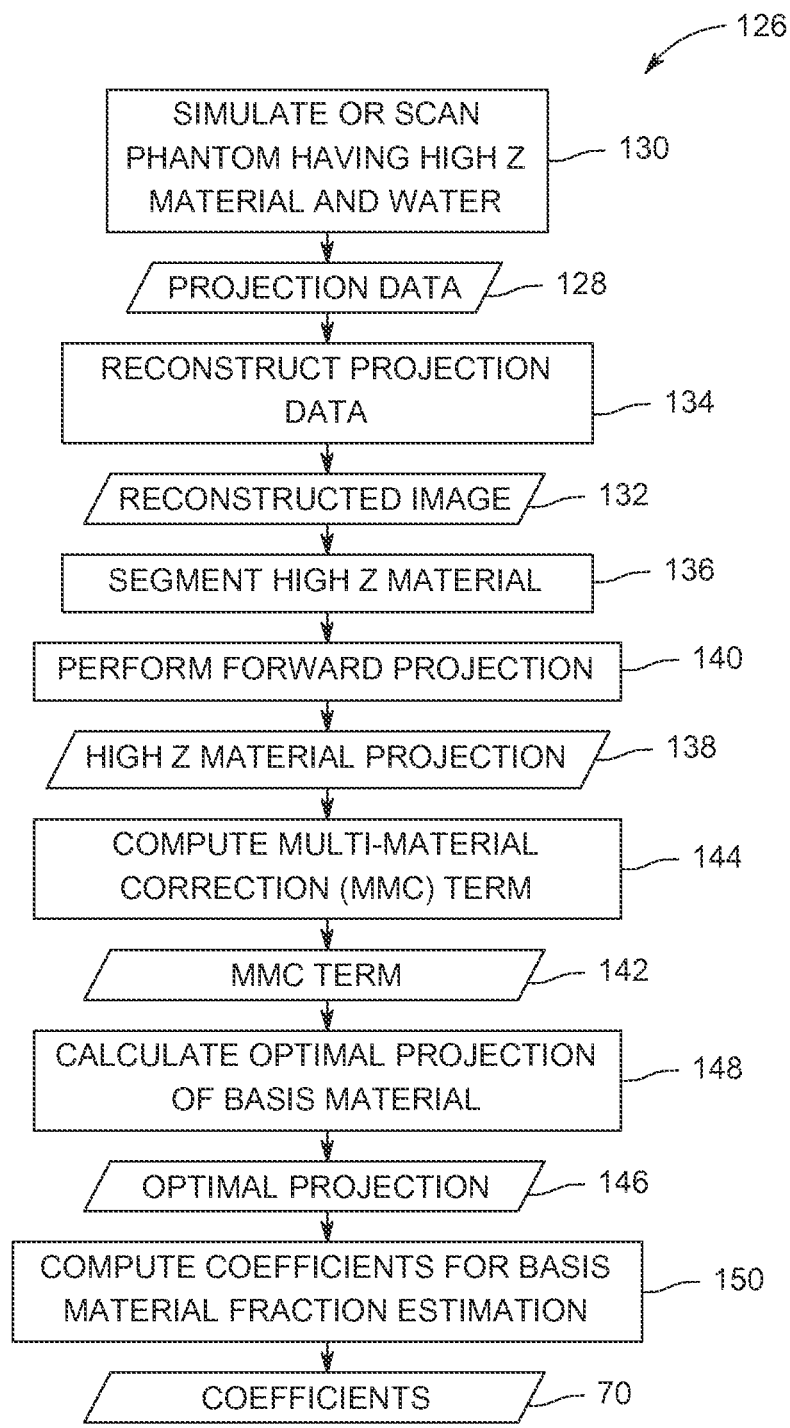
FIG. 4 is a process flow diagram of an embodiment of a method for generating coefficients for use in a generalized modeling function for basis material fraction estimation (e.g., utilizing a simulated or scanned phantom)

FIG. 4 illustrates a process flow diagram of an embodiment of a method 126 for generating coefficients for use in a generalized modeling function for basis material fraction estimation (e.g., utilizing a simulated or scanned phantom). Although the following method 126 may utilize iodine as an example of the basis material for the basis material fraction estimation, the same method 126 may be applied to estimate the basis material fraction of other selected basis materials. Any suitable application-specific or general-purpose computer having a memory and processor may perform some or all of the steps of the method 126. By way of example, as noted above with respect to FIG. 1, the computer 42 and associated memory 46 may be configured to perform the method 126. For example, the memory 46, which may be any tangible, non-transitory, machine-readable medium (e.g., an optical disc, solid state device, chip, firmware), may store one or more sets of instructions that are executable by a processor of the computer 42 to perform the steps of method 126. In accordance with present embodiments, the processor, in performing method 126, may generate coefficients 70 (e.g., $\omega_0$ and $\omega_1$) for the basis material fraction estimation (e.g., iodine or other basis material).

The generation of the coefficients 70 in method 126 occurs during calibration. The method 126 utilizes beam hardening correction or MMC correction without material decomposition (e.g., in the absence of inverse basis material decomposition). The method 126 enables generating coefficients 70 such that the MMC correction terms with material decomposition best match the MMC correction terms without material decomposition. The method 126 may also generate the coefficients 70 without iteration.

Turning to FIG. 4, in the depicted implementation, the method 126 includes simulating or scanning an imaging phantom (i.e., object used as substitute for a live subject or cadaver) to generate projection data 128 (e.g., calibration data) (block 130) via the CT system 10 described above. For example, the phantom may contain a high Z (atomic number) material (e.g., bone) and water. Alternative to bone, the phantom may include another high Z material (e.g., metal). The method 126 includes reconstructing the projection data 128 to generate a reconstructed image 132 (block 134). The method 126 then includes segmenting the high Z material (e.g., bone) from the reconstructed image 132 or image volume (block 136) and performing forward projection to generate a high Z material forward projection 138 (e.g., bone projection, $P_b$) (block 140). Upon obtaining the high Z material forward projection 138, the method 126 includes computing a MMC correction term 142, $\Delta P$, using bone's MMC correction, $f_b$, (block 144) in the following:

$$\Delta P(P_b, P_t) = f_b(P_b, P_t), \quad (17)$$

where $P_t$ represents the total projection (e.g., of bone and water) obtained from the projection data 128. In other embodiments, utilizing a different high Z material a different MMC correction may be utilized. Upon computing the MMC correction term 142, it can be used to determine the optimal coefficients 70 for the basis material fraction estimation (e.g., iodine fraction estimation).

The method 126 includes computing an optimal projection 146 of the basis material fraction (e.g., iodine) (block 148) from the MMC correction term 142 by inversing the basis material's (e.g., iodine's) MMC vectors. The iodine fraction from equation 7 (i.e., the generalized modeling function) that will be forward projected (to get $P_{io}$) and used to compute the MMC correction term 142 using iodine's MMC correction function, $f_{io}$, in general, should satisfy the following condition:

$$f_{io}(P_{io}, P_t) = \Delta P = f_b(P_b, P_t) \tag{18}$$

with, $$P_{io} = \omega_0 \times P_{unit} + \omega_1 \times P_b, \tag{19}$$

where, $P_{unit}$, is the forward projection of the bone voxel whose value is set to unit. The equation 19 is obtained from equation 7 using the linearity in forward projection. Therefore, substituting equation 19 into equation 18, the following equation is obtained:

$$f_{io}(\omega_0 \times P_{unit} + \omega_1 \times P_b, P_t) = \Delta P(P^b, P_t). \tag{20}$$

In equation 20, the only unknown parameters are $\omega_0$ and $\omega_1$ (coefficients 70). Since MMC correction function, $f_{io}$, is nonlinear, a general approach to solve equation 20 is to utilize a nonlinear least square algorithm (e.g., Levenberg-Marquardt algorithm). Alternatively, a 2D mapping table or other numerical method may be utilized to find the best projection, $P_{opt}$, such that $$f_{io}(P_{opt}, P_t) = \Delta P(P_b, P_t). \tag{21}$$

The method 126 then includes computing coefficients 70 for basis material fraction (e.g., iodine fraction) estimation (block 150). In certain embodiments, the optimal projection 146 of the iodine fraction may be utilized to compute the coefficients 70. For example, upon obtaining $P_{opt}$, the following linear equation $$\omega_0 \times P_{unit} + \omega_1 \times P_b = P_{opt} \tag{22}$$

may be solved utilizing a least square method or a linear fitting.

Figure 5A:
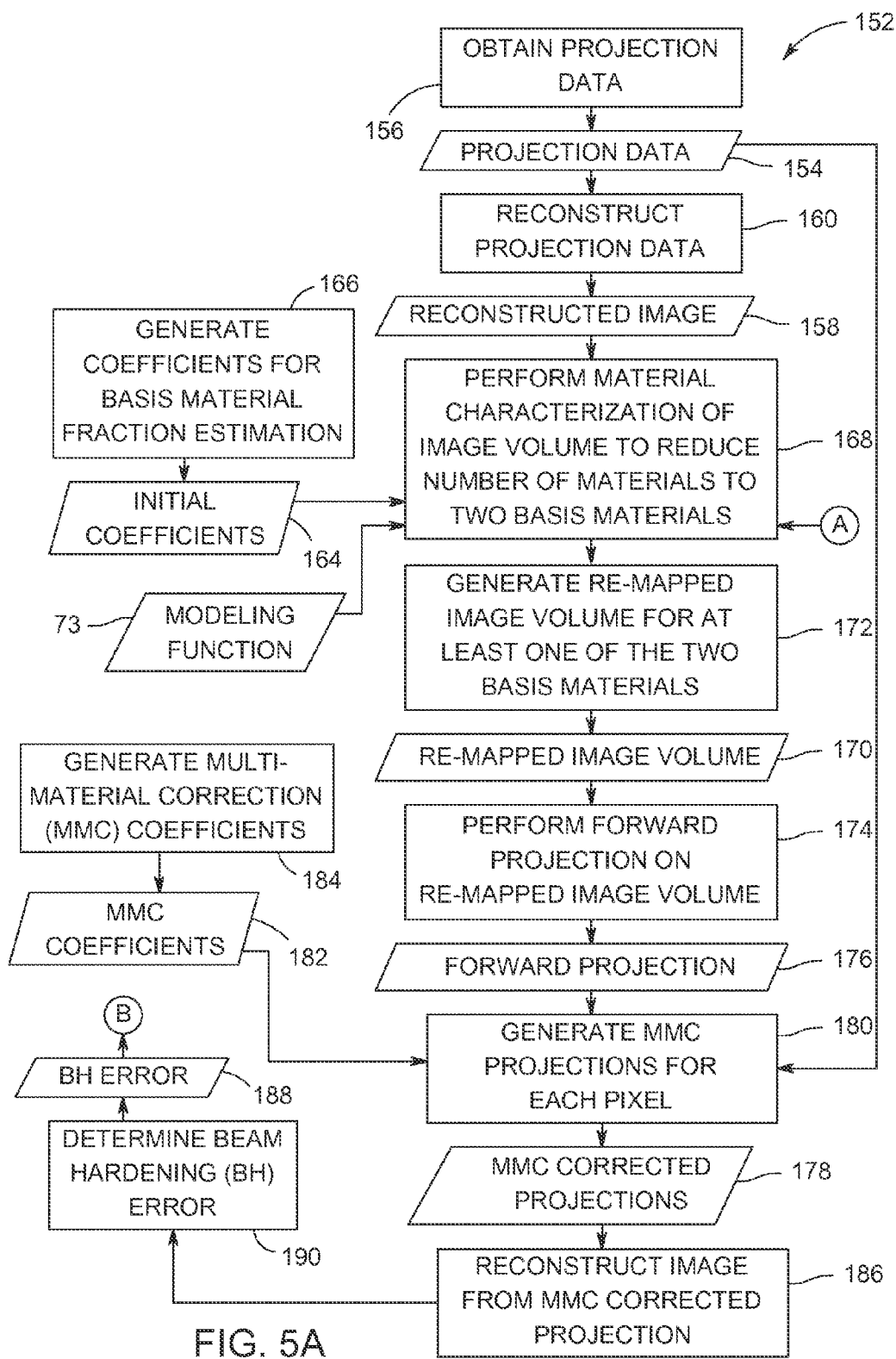
FIG. 5A is a process flow diagram of a first portion of an embodiment of a method for generating coefficients for use in a generalized modeling function for basis material fraction estimation (e.g., involving reiteratively performing MMC)
Figure 5B:
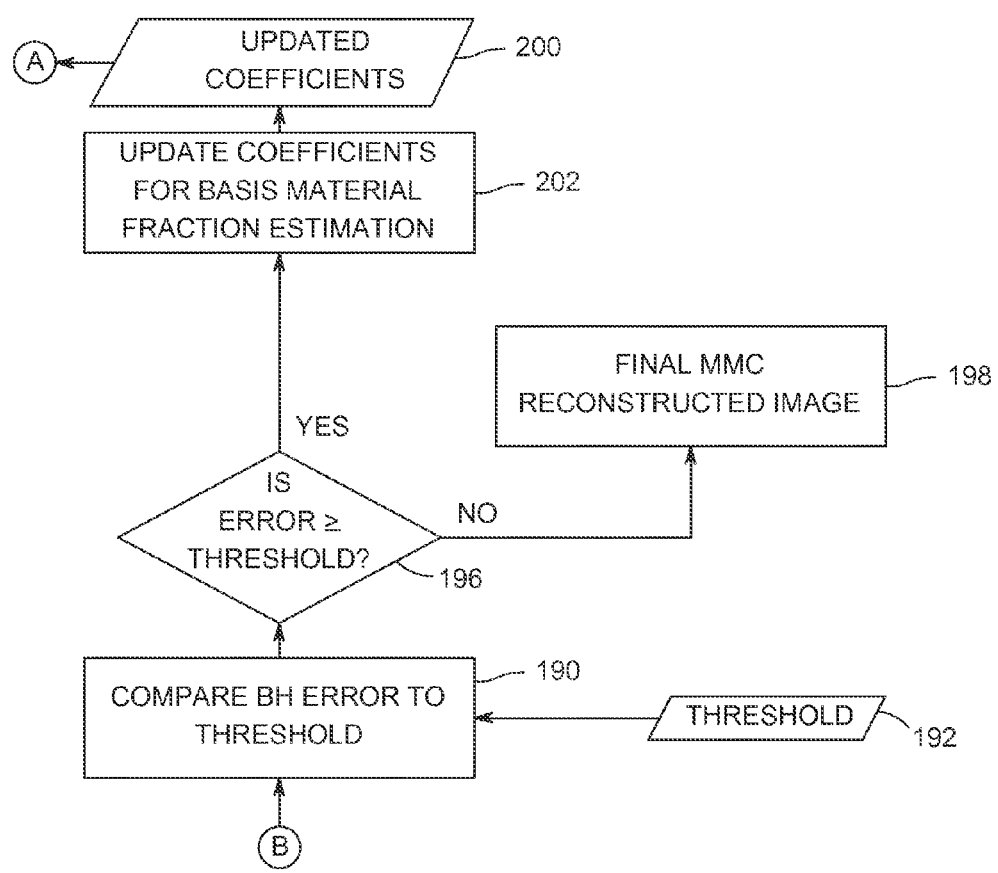
FIG. 5B is a process flow diagram of the second portion of the method for generating coefficients for use in the generalized modeling function for basis material fraction estimation (e.g., involving reiteratively performing MMC) started in FIG. 5A.

FIGS. 5A and 5B depict an alternative approach to generating the coefficients 70. FIGS. 5A (first portion of method 152) and 5B (second portion of method 152) depict a process flow diagram of an embodiment of a method 152 for generating the coefficients 70 for use in a generalized modeling function for basis material fraction estimation (e.g., involving reiteratively performing MMC). Any suitable application-specific or general-purpose computer having a memory and processor may perform some or all of the steps of the method 152. By way of example, as noted above with respect to FIG. 1, the computer 42 and associated memory 46 may be configured to perform the method 152. For example, the memory 46, which may be any tangible, non-transitory, machine-readable medium (e.g., an optical disc, solid state device, chip, firmware), may store one or more sets of instructions that are executable by a processor of the computer 42 to perform the steps of method 152. In accordance with present embodiments, the processor, in performing method 152, may generate coefficients 70 (e.g., $\omega_0$ and $\omega_1$) for the basis material fraction estimation (e.g., iodine or other basis material).

The object of method 152 is to find the coefficients 70 that enable the generation of MMC corrected images having the least amount of hardening artifacts. The method 152 includes obtaining projection data 154 (e.g., datasets) (block 156), for example, by acquiring the projection data 154 via the CT system 10 described above (e.g., via scanning an object). The method 154 also includes reconstructing the projection data 154 from a plurality of pixels (e.g., detector elements) into a reconstructed image 158 (e.g., full field of view (FOV) reconstructed image) (block 160).

The method 152 also includes estimating initial coefficients 164 for the basis material fraction (e.g., iodine fraction) estimation (block 166). The method 152 includes performing material characterization on an image volume (e.g., one or more voxels) of the reconstructed image 158 (block 168) to reduce a number of materials analyzed in each pixel to two basis materials (e.g., iodine and water) as described above in FIG. 2. For example, the material characterization of the image volume may include performing material segmentation followed by utilizing a generalized modeling function (e.g., equation 7) with the initial coefficients 164 to estimate a basis material fraction (e.g., iodine) in each voxel of the image volume.

The method 152 further includes generating a remapped image volume 170 (e.g., material-based projection from a re-mapped pixel) (block 172) for at least one basis material (e.g., iodine) of the two basis materials (e.g., iodine and water). In certain embodiments, remapped projections 170 may be obtained for both basis materials (e.g., iodine and water). To utilize MMC, projections involving two basis materials are needed. For example, the projections involving the two basis materials include a total projection (e.g., water and iodine) attenuated by the object, which also represents both basis materials, and a projection contributed by one of the two basis materials (e.g., iodine) that represents the sums of the equivalent portions of each of the materials (e.g., non-water materials) that is not included in the other basis material of the basis material pair. The method 152 yet further includes performing forward projection on the re-mapped image volume 170 (block 174) to generate a forward projection 176 for at least one basis material (e.g., iodine) to produce a material-based (e.g., iodine-based) projection. Typically, a forward projection is not necessary for the total projection since the total projection from the measurement (i.e., projection data 154) already exists. Thus, only a single forward projection is required. In certain embodiments, forward projections may be performed on both a re-mapped total projection and the re-mapped projection of the projection contributed by one of the two basis materials (e.g., iodine). The image volume is forward-projected using the exact system geometry, and the forward projections are interpolated into the same ray directions and the same number of views as the measured projections (e.g., projection data 154) by the detection system, which results in paired data projection sets.

The method 152 includes generating MMC corrected projections 178 for each pixel based on the material-based projection 176 and initial total projection (e.g., projection data 154) representing attenuation through both of the two basis materials (e.g., iodine and water) (block 180). In certain embodiments, the initial total projection may be a spectrally corrected total raw projection. In certain embodiments, the method 152 may include generating MMC coefficients 182 (block 184), e.g., as described in FIG. 3, which may also be utilized in generating the MMC corrected projections 178 (block 180).

The method 152 further includes reconstructing a MMC reconstructed image from the MMC corrected projections 178 (block 186) and determining the BH error 188 associated with the MMC reconstructed image (block 190). The method 152 includes comparing the BH error 188 to a threshold 192

(block 194). The threshold 192 may derived from the BH error table 124 generated in the method 92. The comparison determines if the BH error 188 is greater than or equal to the threshold 192 (block 196). If the BH error 188 is less than the threshold 192, the MMC reconstructed image becomes the final MMC reconstructed image 198. If the BH error 188 is greater than or equal to the threshold 192, the coefficients for basis material estimation are updated to generate updated coefficients 200 (block 202). Upon updating the coefficients, the updated coefficients 200 are utilized in performing the material characterization 168 and subsequent steps of the method 152 as described above. This sequence of steps may be iteratively repeated until the MMC reconstructed image has the BH error 188 below the threshold 192.

The coefficients 70 for the basis material fraction estimation may be derived in an alternative technique from those described in the methods 126 and 152. For example, water and iodine may be selected as the two basis materials, and bone as the material to be decomposed. A series of water-bone and water-iodine combination layers may be scanned or simulated (e.g., using a phantom). The projection data gathered from these combination layers may be modeled, and the coefficients 70 may be generated such that the water-bone case can be converted to the water-iodine case. In this approach, MMC correction and reconstruction may not be utilized.

In certain techniques, a more generalized function, $f(HU_x)$, for basis material fraction estimation (e.g., iodine fraction) than the first order polynomial in equation 7 may be utilized. The generalized function, $f(HU_x)$, can be linear or nonlinear. The coefficients for the generalized function can be solved from the following equation:

$$Proj(f(HU_x))=P_{opt}. \quad (23)$$

Using the principle of image reconstruction, we have $$f(HU_x)=R^{-1}P_{opt}, \quad (24)$$

where $R^-$ denotes the image reconstruction from projection (i.e., $P_{opt}$). So the problem turns to solving equation 24, which can be done by utilizing conventional linear or nonlinear fitting methods. In particular if a higher order polynomial function is used as $f(HU_x)$ to model the iodine fraction estimation, image reconstruction from $P_{opt}$ can be avoided. Given, $$HU_{Xio} \approx \Sigma_{j=0}^N \omega_j \times HU_x^j. \quad (25)$$

Then, similar to equation 22, using the linearity of the forward projection, the following equation can be fitted $$\Sigma_{j=0}^N \omega_j \times P_b^j = P_{opt}, \quad (26)$$

where $P_b^j$ is the forward projection of bone voxel powered by j. Once the coefficients are obtained, they can be used to estimate how much basis material fraction for each voxel, and then MMC correction can be applied. As noted above, the same approach may be utilized to determine the corresponding optimal coefficients utilizing another high Z material in lieu of bone.

Technical effects of the disclosed embodiments include providing a MMC approach to minimize artifacts in reconstructed images. In addition, the MMC approach utilizes a generalized modeling function to estimate a basis material fraction. This results in more accurate and consistent CT values of bone, soft tissue, and contrast agent for better clinical diagnosis. Direct clinical benefits of the MMC approach include improved image quality, better differentiation between cysts and metastases, and accurate contrast measurement in CT perfusion.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
acquiring a first set of projection data of an object from a plurality of detector elements;
reconstructing the acquired first set of projection data from the plurality of detector elements into a first reconstructed image;
performing material characterization of an image volume of the first reconstructed image to reduce a number of materials analyzed in the image volume to two basis materials, wherein performing material characterization of the image volume comprises utilizing a generalized modeling function to estimate a fraction of at least one basis material within each voxel of the image volume;
generating a re-mapped image volume for the at least one basis material of the two basis materials;
performing forward projection on at least the re-mapped image volume for the at least one basis material to produce a material-based projection; and
generating multi-material corrected projections based on the material-based projection and a total projection attenuated by the scanned object, which represents both of the two basis materials.

2. The method of claim 1, wherein the two basis materials comprise iodine and water, and the at least one basis material comprises iodine.

3. The method of claim 1, wherein inverse basis material decomposition is not utilized in material characterization of the image volume.

4. The method of claim 1, wherein the generalized modeling function comprises a polynomial function.

5. The method of claim 1, wherein the generalized modeling function is a linear function.

6. The method of claim 1, wherein the generalized modeling function is a nonlinear function.

7. The method of claim 1, wherein utilizing the generalized modeling function to estimate a fraction of the at least one basis material comprises generating coefficients for the generalized modeling function.

8. The method of claim 7, wherein generating the coefficients for the generalized modeling function comprises initially estimating the coefficients for the generalized modeling function, reconstructing a multi-material corrected image from the multi-material corrected projections, and updating the coefficients based on multi-material corrected projections.

9. The method of claim 7, wherein generating the coefficients for the generalized modeling function comprises simulating or scanning a phantom comprising a high z material and water to obtain a second set of projection data, reconstructing the second set of projection data into a second reconstructed image, segment the high z material from the second reconstructed image, performing forward projection on the segmented portion of the second reconstructed image having the high z material, and computing a multi-material correction term for the high z material based at least on the forward projection of the high z material.

10. The method of claim 9, wherein generating the coefficients for the generalized modeling function comprises utilizing at least the multi-material correction term and a nonlinear least square algorithm to generate the coefficients for the generalized modeling function.

11. The method of claim 9, wherein generating the coefficients for the generalized modeling function comprises utilizing at least the multi-material correction term to calculate an optimal projection for the at least one basis material to generate the coefficients for the generalized modeling function, and utilizing at least the optimal projection and a least square method or a linear fitting to generate the coefficients or the generalized modeling function.

12. The method of claim 9, wherein the at least one basis material comprises iodine, and the high z material comprises bone.

13. The method of claim 1, comprising reconstructing a final multi-material corrected image from the multi-material corrected projections.

14. One or more non-transitory computer-readable media encoding one or more processor-executable routines, wherein the one or more routines, when executed by a processor, cause acts to be performed comprising:
    acquiring a first set of projection data of an object from a plurality of detector elements;
    reconstructing the acquired first set of projection data from the plurality of detector elements into a first reconstructed image;
    performing material characterization of an image volume of the first reconstructed image to reduce a number of materials analyzed in the image volume to two basis materials, wherein performing material characterization of the image volume comprises utilizing a generalized modeling function to estimate a fraction of at least one basis material within each voxel of the image volume;
    generating a re-mapped image volume for the at least one basis material of the two basis materials;
    performing forward projection on at least the re-mapped image volume for the at least one basis material to produce a material-based projection; and
    generating multi-material corrected projections based on the material-based projection and a total projection attenuated by the scanned object, which represents both of the two basis materials.

15. The one or more non-transitory computer-readable media of claim 14, wherein the one or more-routines, when executed by the processor, cause further acts to be performed comprising:
    utilizing the generalized modeling function to estimate a fraction of the at least one basis material comprises generating coefficients for the generalized modeling function.

16. The one or more non-transitory computer-readable media of claim 15, wherein generating the coefficients for the generalized modeling function comprises simulating or scanning a phantom comprising a high z material and water to obtain a second set of projection data, reconstructing the second set of projection data into a second reconstructed image, segment the high z material from the second reconstructed image, performing forward projection on the segmented portion of the second reconstructed image having the high z material, and computing a multi-material correction term for the high z material based at least on the forward projection of the high z material.

17. The one or more non-transitory computer-readable media of claim 16, wherein generating the coefficients for the generalized modeling function comprises utilizing at least the multi-material correction term and a nonlinear least square algorithm to generate the coefficients for the generalized modeling function.

18. The one or more non-transitory computer-readable media of claim 17, wherein generating the coefficients for the generalized modeling function comprises utilizing at least the multi-material correction term to calculate an optimal projection for the at least one basis material to generate the coefficients for the generalized modeling function, and utilizing at least the optimal projection and a least square method or a linear fitting to generate the coefficients or the generalized modeling function.

19. A system comprising:
    a memory structure encoding one or more processor-executable routines wherein the routines, when executed cause acts to be performed comprising:
        acquiring a first set of projection data of an object from a plurality of detector elements;
        reconstructing the acquired first set of projection data from the plurality of detector elements into a first reconstructed image;
        performing material characterization of an image volume of the first reconstructed image to reduce a number of materials analyzed in the image volume to two basis materials, wherein performing material characterization of the image volume comprises utilizing a generalized modeling function to estimate a fraction of at least one basis material within each voxel of the image volume;
        generating a re-mapped image volume for the at least one basis material of the two basis materials;
        performing forward projection on at least the re-mapped image volume for the at least one basis material to produce a material-based projection; and
        generating multi-material corrected projections based on the material-based projection and a total projection attenuated by the scanned object, which represents both of the two basis materials; and
    a processing component configured to access and execute the one or more routines encoded by the memory structure.

20. The system of claim 19, wherein the routines, when executed by the processor, cause further acts to be performed comprising:
    utilizing the generalized modeling function to estimate a fraction of the at least one basis material comprises generating coefficients for the generalized modeling function.

* * * * *